United States Patent
Andreae et al.

(10) Patent No.: US 7,769,522 B2
(45) Date of Patent: Aug. 3, 2010

(54) APPARATUS AND METHOD FOR PREVENTING AN UNDERSPEED EVENT OF A TURBOCHARGER

(75) Inventors: Morgan Andreae, Columbus, IN (US); Kirtan Bhandary, Columbus, IN (US); Adrian Dale, Columbus, IN (US); Jeffrey A. Matthews, Columbus, IN (US); Vivek A. Sujan, Columbus, IN (US)

(73) Assignee: Cummins IP, Inc, Minneapolis, MN (US)

( * ) Notice: Subject to any disclaimer, the term of this patent is extended or adjusted under 35 U.S.C. 154(b) by 328 days.

(21) Appl. No.: 12/040,474

(22) Filed: Feb. 29, 2008

(65) Prior Publication Data

US 2009/0222190 A1    Sep. 3, 2009

(51) Int. Cl.
G06F 19/00 (2006.01)
F02D 23/00 (2006.01)
F02B 33/44 (2006.01)

(52) U.S. Cl. ............ 701/102; 60/600; 60/602; 60/605.1

(58) Field of Classification Search .......... 701/99–102; 60/597, 600, 602, 605.1, 611
See application file for complete search history.

(56) References Cited

U.S. PATENT DOCUMENTS

| | | | |
|---|---|---|---|
| 4,277,830 A * | 7/1981 | Reid et al. | 701/99 |
| 4,483,147 A | 11/1984 | Evans et al. | |
| 5,437,539 A | 8/1995 | Gysling et al. | |
| 5,508,943 A | 4/1996 | Batson et al. | |
| 6,092,029 A | 7/2000 | Bently | |
| 6,317,655 B1 | 11/2001 | Khots et al. | |
| 6,364,602 B1 | 4/2002 | Andrew et al. | |
| 6,438,484 B1 | 8/2002 | Andrew et al. | |
| 6,536,284 B2 | 3/2003 | Bonanni | |
| 6,785,604 B2 | 8/2004 | Jacobson | |
| 6,945,047 B2 | 9/2005 | Shea et al. | |
| 7,089,738 B1 | 8/2006 | Boewe et al. | |
| 7,127,893 B2 * | 10/2006 | Schmid et al. | 60/605.2 |
| 7,650,218 B2 * | 1/2010 | Andreae et al. | 701/101 |
| 2009/0178406 A1 * | 7/2009 | Matthews et al. | 60/602 |
| 2009/0188251 A1 * | 7/2009 | Dale et al. | 60/600 |
| 2009/0211248 A1 * | 8/2009 | Andreae et al. | 60/611 |

FOREIGN PATENT DOCUMENTS

WO    2006022635 A1    3/2006

* cited by examiner

*Primary Examiner*—Willis R Wolfe, Jr.
(74) *Attorney, Agent, or Firm*—Kunzler Needham Massey & Thorpe

(57) ABSTRACT

A method is disclosed for preventing an underspeed event of a turbocharger. The method includes interpreting a turbocharger speed, a compressor differential pressure (CDP) and a turbocharger differential pressure (TDP). The method further includes calculating a thrust load capacity (TLC) based on the turbocharger speed, and calculating a current thrust load (CTL) based on the CDP and the TDP. The method further includes calculating a thrust margin based on the TLC and the CTL, and controlling an actuator in response to the thrust margin. Controlling the actuator includes maintaining the thrust margin to a thrust margin target, which may be a function of the turbocharger speed. The actuator is a turbine bypass valve, a compressor bypass valve, a variable geometry turbocharger position, an exhaust throttle and/or an exhaust gas recirculation valve that controls the turbocharger speed.

28 Claims, 4 Drawing Sheets

APPARATUS AND METHOD FOR PREVENTING AN UNDERSPEED EVENT OF A TURBOCHARGER

BACKGROUND OF THE INVENTION

1. Field of the Invention

This invention relates to turbocharger control and more particularly relates to preventing an underspeed event of a turbocharger.

2. Description of the Related Art

Turbochargers are a common feature on combustion engines to enhance performance. Continuing demand for power density and torque combined with emissions regulations have driven innovation in turbocharger hardware and turbocharger control systems. Hardware related to turbocharger control, such as wastegates, relief valves, bypass valves, EGR valves, variable geometry turbines, and adjustable vanes have been known in the art for some time. Furthermore, some contemporary engines have multiple turbochargers to manage competing design criteria. For example, many engines include a small turbocharger for better response at low engine loads. Smaller turbochargers pose additional control challenges as the lower mass of the turbines means that they are more responsive to changes in pressure and mass flow, and thereby more affected by such changes which can cause speed overshoots and undershoots.

Turbo shafts that mechanically couple the turbine to a compressor in the turbocharger may also be at risk for damage if an underspeed event occurs. The thrust load that a turbo shaft may support is related to the lubricating oil film strength on the turbo shaft. Generally, a turbo shaft rotating at a higher speed provides a stronger oil film and therefore supports a higher thrust load than a turbo shaft rotating at a lower speed.

Certain transient events, such as a heavy truck accelerating from a standstill, can cause a high thrust load on the turbocharger while the turbocharger speed is low. Prior to acceleration, the turbocharger is rotating at a low speed and the corresponding turbo shaft is rotating at a low speed, i.e. the turbo shaft has a weak oil film and low thrust load capacity. Initially, the thrust load on the turbocharger shaft is low as the truck is immobile, providing a suitable operational environment for the turbocharger. However, a hard acceleration can cause a large pressure differential across the turbocharger before the mass flow through the turbocharger accelerates the turbocharger to a high speed. Engine braking, engine manipulations to generate temperature for regenerating an aftertreatment device, and other transient events can similarly cause high pressure differentials across the turbocharger while the turbocharger is rotating at a relatively slow speed. The recent prevalence of small, highly responsive turbochargers exacerbates transient problems as the turbocharger is capable of more rapid deceleration while still experiencing a thrust load.

SUMMARY OF THE INVENTION

From the foregoing discussion, Applicant asserts that a need exists for an apparatus and method that prevents underspeed of a turbocharger. Beneficially, such an apparatus and method would detect the approach of an underspeed event to allow prevention of an underspeed event using currently available hardware.

The present invention has been developed in response to the present state of the art, and in particular, in response to the problems and needs in the art that have not yet been fully solved by currently available methods. Accordingly, the present invention has been developed to provide an apparatus and method for preventing underspeed events that overcome many or all of the above-discussed shortcomings in the art.

An apparatus is disclosed for preventing an underspeed event of a turbocharger. The apparatus includes a turbocharger speed determination module interpreting a turbocharger speed, a thrust load capacity determination module calculating a thrust load capacity (TLC) based on the turbocharger speed, and a differential pressure determination module interpreting a compressor differential pressure (CDP) and a turbocharger differential pressure (TDP). The apparatus further includes a current thrust load determination module calculating a current thrust load (CTL) based on the CDP and the TDP, a thrust margin determination module calculating a thrust margin based on the TLC and the CTL, and an actuation module controlling a bypass valve according to the thrust margin.

A method is disclosed for preventing an underspeed of a turbocharger. The method includes interpreting the turbocharger speed, calculating the thrust load capacity (TLC) based on the turbocharger speed, and interpreting the CDP and the TDP. The method further includes calculating the CTL based on the CDP and the TDP, calculating the thrust margin based on the TLC and the CTL, and controlling an actuator in response to the thrust margin. In one embodiment, the method includes calculating the TLC by applying the turbocharger speed to a best-fit regression function. The best-fit regression function includes predetermined TLC values corresponding to predetermined turbocharger speed values. The best-fit regression function may be linear.

The thrust margin may be determined as a ratio of CTL/TLC, as a difference of TLC-CTL, or through other means understood in the art. The method includes controlling an actuator from the group: a turbine bypass valve, a compressor bypass valve, a variable geometry turbocharger position, an intake throttle, an exhaust throttle, an EGR valve, and an engine speed target. The method includes, in one embodiment, calculating an error term comprising an amount by which the CTL exceeds the thrust load margin, and adjusting the actuator to minimize an error term. The method includes selecting a first thrust margin target above a turbocharger speed threshold, and a second thrust margin target below the turbocharger speed threshold. In one embodiment, the thrust load margin comprises a function of the turbocharger speed.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the U invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
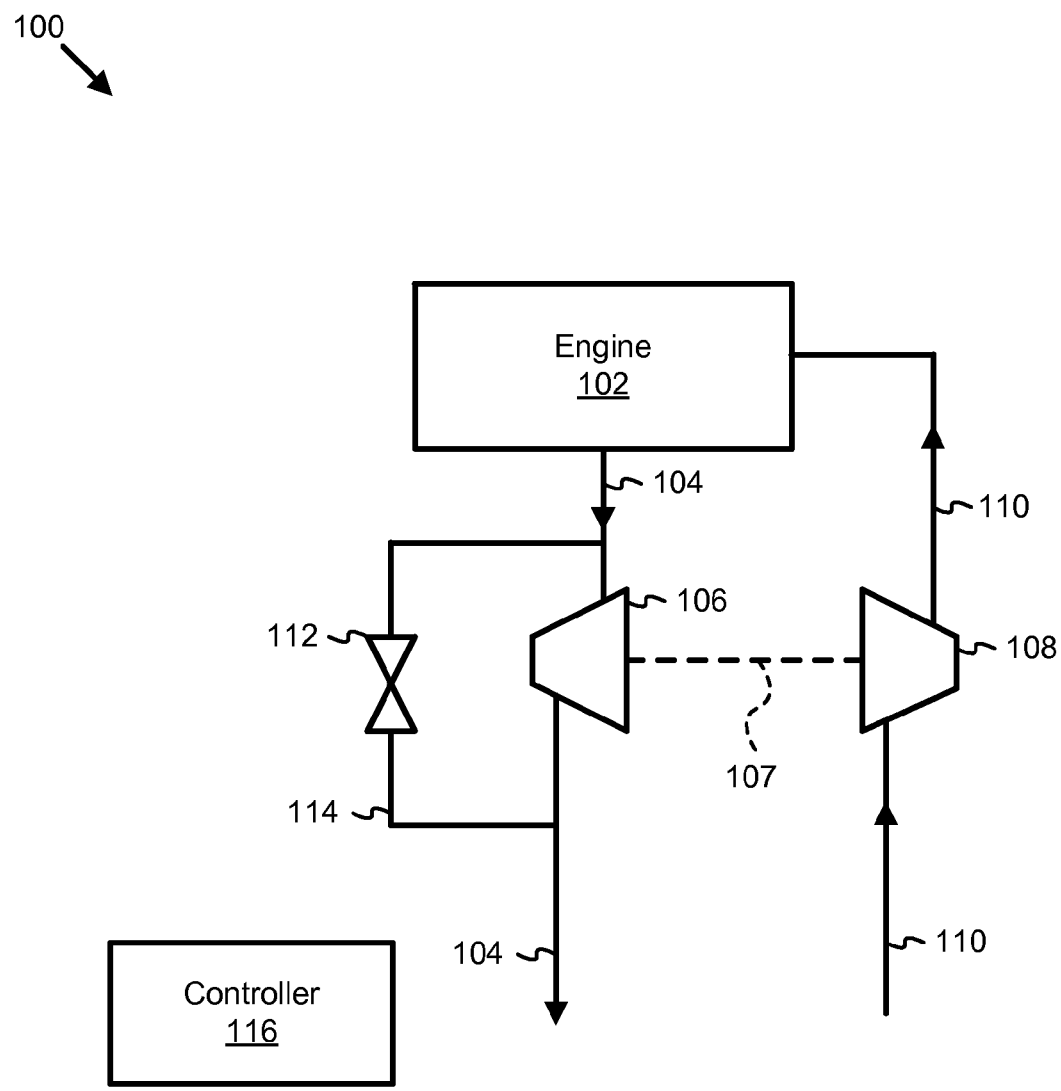
FIG. 1 is a schematic block diagram depicting one embodiment of a system to prevent an underspeed event of a turbocharger in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic illustration depicting one embodiment of a system 100 for preventing an underspeed event of a turbocharger in accordance with the present invention. The system 100 comprises an engine 102 producing an exhaust stream 104 directed through a turbine 106 mechanically coupled, via a turbo shaft 107, to a compressor 108. The turbo shaft 107 may be continuously lubricated during operation of the engine 102 by the presence of oil and the action of the rotating turbo shaft 107 dragging a film of oil over the turbo shaft 107. In a typical embodiment, the faster the turbo shaft 107 rotates the stronger the oil film coverage and therefore the greater thrust load that may be placed on the turbo shaft 107 without damage to the turbo shaft 107.

The system 100 further comprises the compressor 108 that may receive an intake stream 110 directed to the engine 102. The system 100 further includes an actuator 112. In the depicted embodiment the actuator 112 comprises a turbocharger bypass valve 112 disposed within an exhaust bypass path 114. In other contemplated embodiments the actuator 112 may consist of a compressor bypass valve disposed within a compressor bypass path and/or a variable geometry turbocharger. In one embodiment, the actuator may comprise an intake throttle, an exhaust throttle, an exhaust gas recirculation (EGR) valve, and/or a change in an engine operating parameter such as engine speed, air flow targets, etc.

The system 100 further comprises a controller 116. The controller 116 may be in communication with the turbocharger 106, the compressor 108, the actuator 112, and/or any other network datalink related to the operation of the engine 102. The controller 116 may interpret a plurality of electronic signals from strategically placed sensors and/or datalinks throughout the system 100 indicating turbocharger 106 and compressor 108 rotational speeds, mass flows, pressures, and/or temperatures. The controller 116 may be configured to control the actuator 112 to prevent underspeed of the turbocharger 106 in response to interpreting the plurality of electronic signals. The controller 116 may further comprise modules configured to functionally execute the steps of preventing an underspeed event of a turbocharger. In one embodiment, the controller includes a turbocharger speed determination module, a thrust load capacity (TLC) module, a differential pressure determination module, a current thrust load (CTL) determination module, a thrust margin determination module, and an actuation module.

Figure 2:
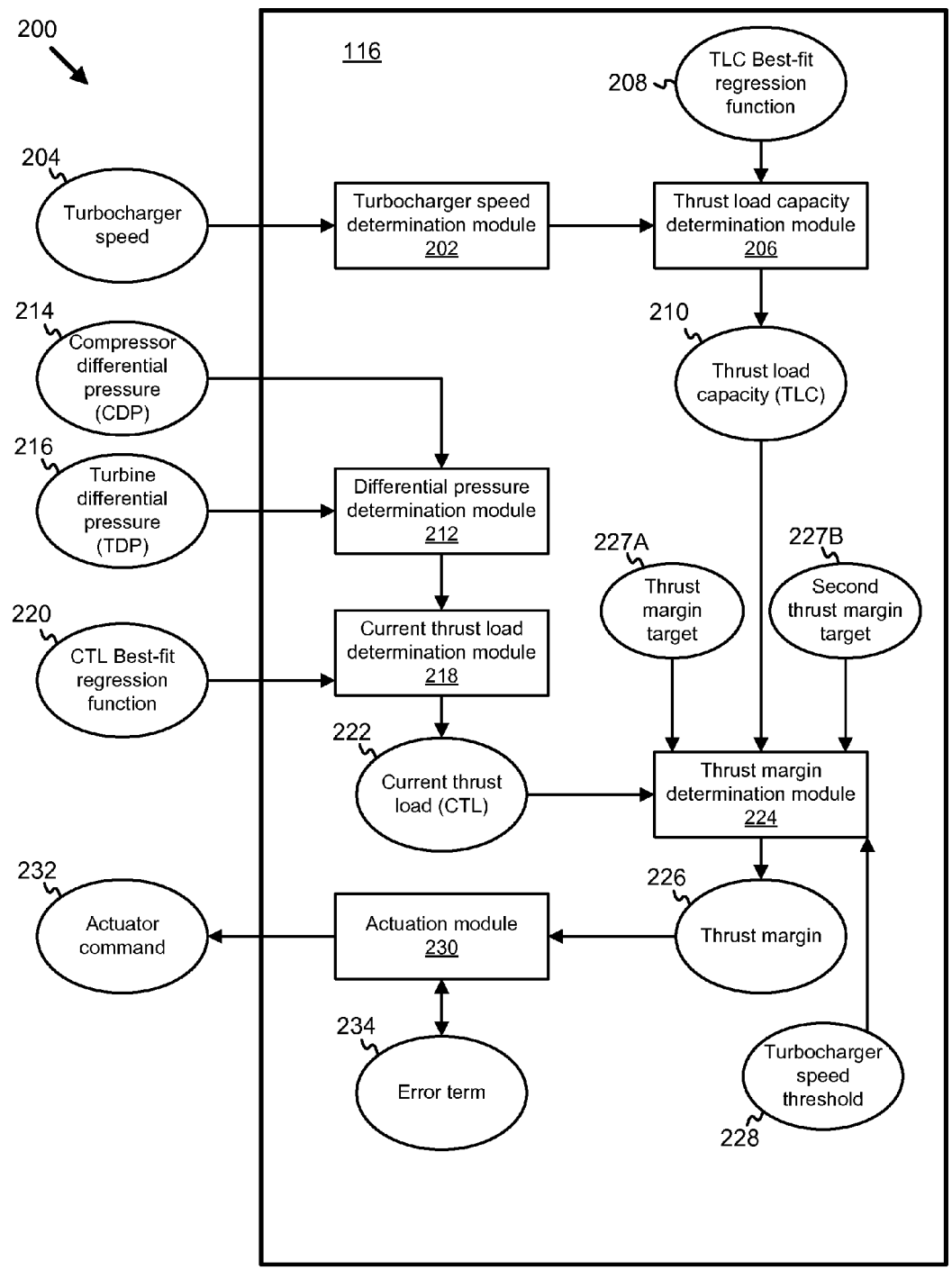
FIG. 2 is a schematic block diagram illustrating an alternate embodiment of an apparatus to prevent an underspeed event of a turbocharger in accordance with the present invention.

FIG. 2 is a schematic block diagram illustrating one embodiment of an apparatus 200 to prevent an underspeed of a turbocharger 106 in accordance with the present invention. The apparatus 200 comprises the controller 116. In the depicted embodiment the controller 116 comprises a turbocharger speed determination module 202 that interprets a turbocharger speed 204. The turbocharger speed 204 may comprise a direct measure of the turbocharger speed 204, a value derived from another system 100 parameter such as mass flow, and/or a direct reading of turbocharger speed 204 over a datalink or the like.

The controller 116 further comprises a thrust load capacity determination module 206 that calculates a TLC 210 based on the turbocharger speed 204. In one embodiment the thrust load capacity 208 may comprise an estimate of the amount of force that may be applied perpendicularly to the turbo shaft 107 for a given rotational speed of the turbo shaft 107. For a given application it may be useful to define thrust load according to other system 100 parameters, for example in terms of allowable pressure drop across the compressor 108 added to allowable pressure drop across the turbine 106. In one embodiment of the thrust load capacity determination module 206, calculating the TLC 210 based on the turbocharger speed 204 comprises applying the turbocharger speed 204 to a best-fit regression function. The best-fit regression function may be based on predetermined TLC values corresponding to predetermined turbocharger speed 204 values. In a further embodiment the best-fit regression function comprises a best-fit linear regression function that outputs the TLC 210 as a function of the turbocharger speed 204.

The controller 116 comprises the differential pressure determination module 212 configured to interpret a compressor differential pressure (CDP) 214 and a turbine differential pressure (TDP) 216. The differential pressure determination module 212 may interpret the CDP 214 and the TDP 216 as functions of other system parameters, by direct reading of turbocharger inlet and outlet pressures, or by reading values from a datalink. The controller 116 further includes a current thrust load determination module 218 configured to calculate a CTL 222 based on the CDP 214 and the TDP 216. In one embodiment calculating the CTL 222 based on the CDP 214 and the TDP 216 comprises applying the CDP 214 and TDP 216 to a best-fit regression function. The best-fit regression function may be based on predetermined CTL 222 values corresponding to predetermined CDP 214 and TDP 216 values.

In one embodiment, the function based on the predetermined CTL 222 values corresponding to predetermined CDP 214 and TDP 216 values comprises a look-up table stored on a computer readable medium. Determining the CTL 222 for a given CDP 212 and TDP 216 may be determined by one of skill in the art sampling data at a few operating points for a given application of the present invention. As the CTL 222 comprises a floating value dependent upon the speed of rotation of the turbocharger 106, tracking the CDP 214 and the TDP 216 may advantageously provide a means for tracking the CTL 222 during varying modes of engine 102 operation. In one embodiment, the CTL 222 is fit to the CDP 214 and the TDP 216 according to the following equation:

$$CTL = K_1 * CDP + K_2 * TDP \qquad \text{Equation 1.}$$

In Equation 1, the $K_1$ is a value that normalizes the units of CDP 214 into the units of CTL 222, and weights the compressor 108 portion of the CTL 222, and the $K_2$ is a value that normalizes the units of TDP 216 into the units of CTL 222 and weights the turbine 106 portion of the CTL 222. In one embodiment, the ratio $K_1/K_2$ varies between about 0.25 to 4.0, allowing the compressor 108 or the turbine 106 to dominate the CTL 222 depending upon the specific application, for example if the flow area of the compressor 108 and/or turbocharger 106 is larger. In one embodiment, the ratio $K_1/K_2$ varies between about 1.25 to 5.0, allowing the compressor 108 to dominate the CTL 222 depending upon the specific application.

The controller 116 further comprises a thrust margin determination module 224 that calculates a thrust margin 226 based on the TLC 210 and the CTL 222. In one example calculating the thrust margin 226 includes calculating the ratio of CTL/TLC. In an alternate example calculating the thrust margin 226 includes calculating a difference TLC-CTL. Other specified relationships between the CTL 222 and the TLC 210 may be used to determine the thrust margin. The desired relationship between the CTL 222 and the TLC 210 to determine the thrust margin 226 may be selected by one of skill in the art for a specific embodiment and may comprise the relationship that contains the most useful values for a given range of values, and/or comprises the simplest calculation. In one embodiment the thrust margin determination module 220 determines a thrust margin target 227A. In one embodiment, the thrust margin target 227A is a predetermined value by which the CTL 222 should be low relative to the TCL 210. The thrust margin target 227A may be a variable based on system operating conditions, for example the thrust margin target 227A may be a value that can be reduced during high performance operating conditions and increased during low performance operating conditions, during derate events, and the like.

Determining the thrust margin target 227A may comprise selecting a first thrust margin target 227A in response to the turbocharger speed 204 have value greater than a turbocharger speed threshold 228, and selecting a second thrust margin target 227B in response to the turbocharger speed 204 having a value not greater than the turbocharger speed threshold 228. In one embodiment, the second thrust margin target 227B is greater than the first thrust margin target 227A. In one embodiment, the accuracy and time lag of turbocharger speed 204 determination decreases when the turbocharger speed 204 is low.

The controller 116 further comprises the actuation module 230 that controls the bypass valve 112 and/or other actuator 112 in response to the thrust margin 226. In an alternate embodiment controlling the actuator 112 in response to the thrust margin 226 comprises adjusting the actuator 112 such that the thrust margin 226 achieves the thrust margin target, 227A, 227B. In one embodiment, the actuation module 224 determines an error term 234 comprising an amount by which the thrust margin 226 exceeds the thrust margin target 227A, 227B and adjusts the actuator 112 to minimize the error term 234. For example, the current thrust margin 226 may comprise a value of 75, and the thrust margin target 227A may comprise a value of 60, where the error term 234 has a value of −15, indicating that the current thrust margin 226 is lower than the desired value. Of course, the sign convention of the error term 234 may be reversed. In one example the actuation module 224 may produce an actuator command 232 directed to the actuator 112.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
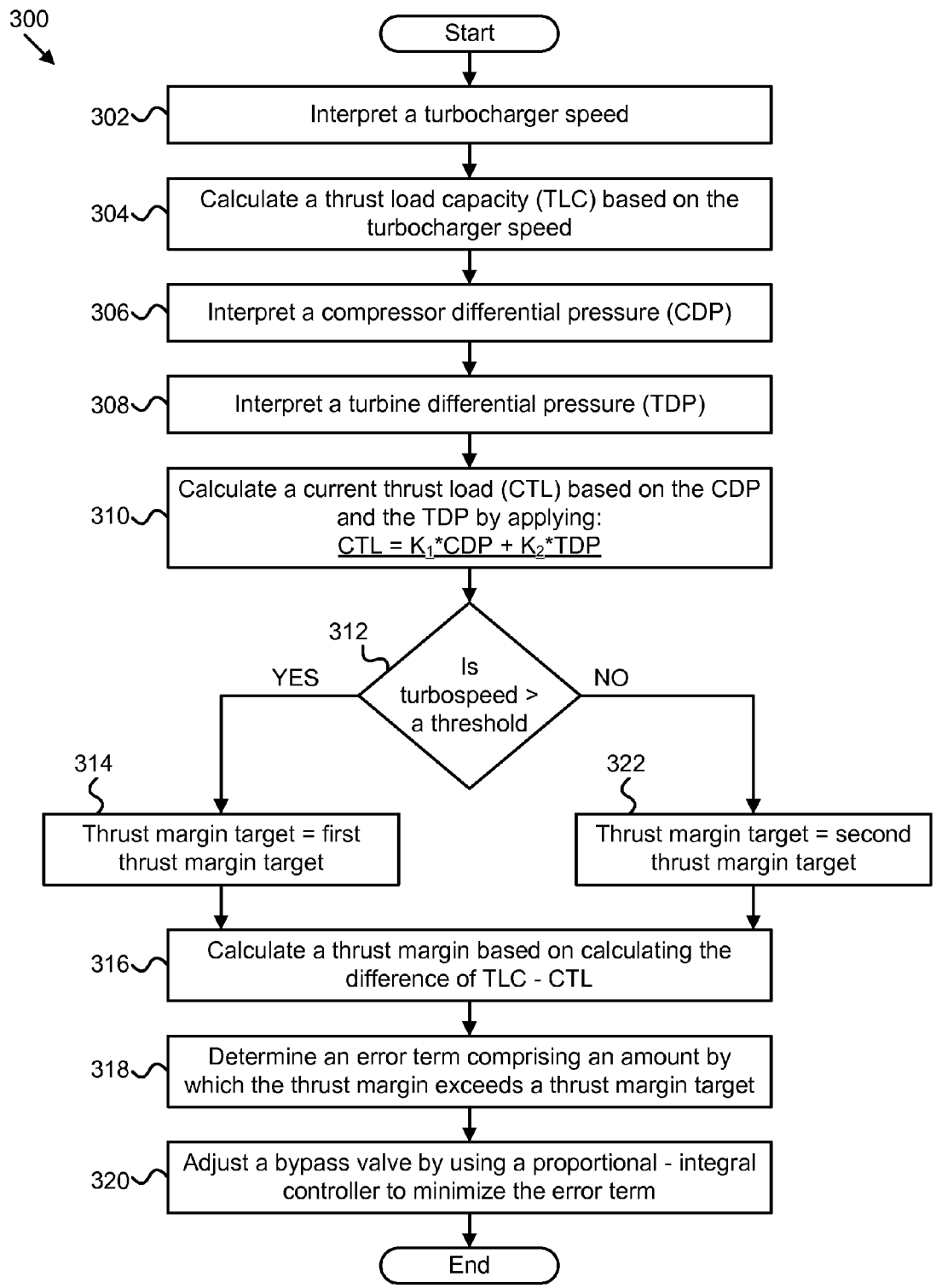
FIG. 3 is a schematic flow chart diagram illustrating one embodiment of a method for preventing an underspeed event of a turbocharger in accordance with the present invention.

FIG. 3 is a schematic flow chart diagram illustrating one embodiment of a method 300 for preventing an underspeed of a turbocharger in accordance with the present invention. In one embodiment the method 300 may be implemented as a computer program product comprising a computer readable medium having a computer readable program. The method 300 comprises a turbocharger speed determination module 202 interpreting 302 a thrust load capacity module 206 calculating 304 a TLC 210 based on the turbocharger speed 204. The method 300 includes a differential pressure module 212 interpreting 306 a CDP and interpreting 308 a TDP. The method 300 continues with a current thrust load determination module calculating 310 a CTL based on the CDP and the TDP. In one embodiment of the present invention calculating the CTL based on the CDP and the TDP comprises applying a function such as Equation 1 listed above.

The method 300 further includes a thrust determination module 224 determining whether a turbocharger speed 204 is greater than a threshold 228. If the turbocharger speed 204 is higher than the threshold 228, the thrust margin determination module 228 may determine 314 a thrust margin target 226 as a first thrust margin target 227A. If the turbocharger speed 204 is not higher than the threshold 228, the thrust margin determination module 228 may determine 322 the thrust margin target 226 as a second thrust margin target 227B. In one embodiment, the thrust margin determination module 228 calculates 316 the thrust margin 226 based on calculating the difference of TLC-CTL. The actuation module 230 determines 318 an error term 234 comprising an amount by which the thrust margin 226 exceeds a thrust margin target 227A, 227B. The method 300 concludes by the actuation module 230 controlling 320 the actuator 112 in response to the thrust margin 226, for example by minimizing the error term 226.

Figure 4:
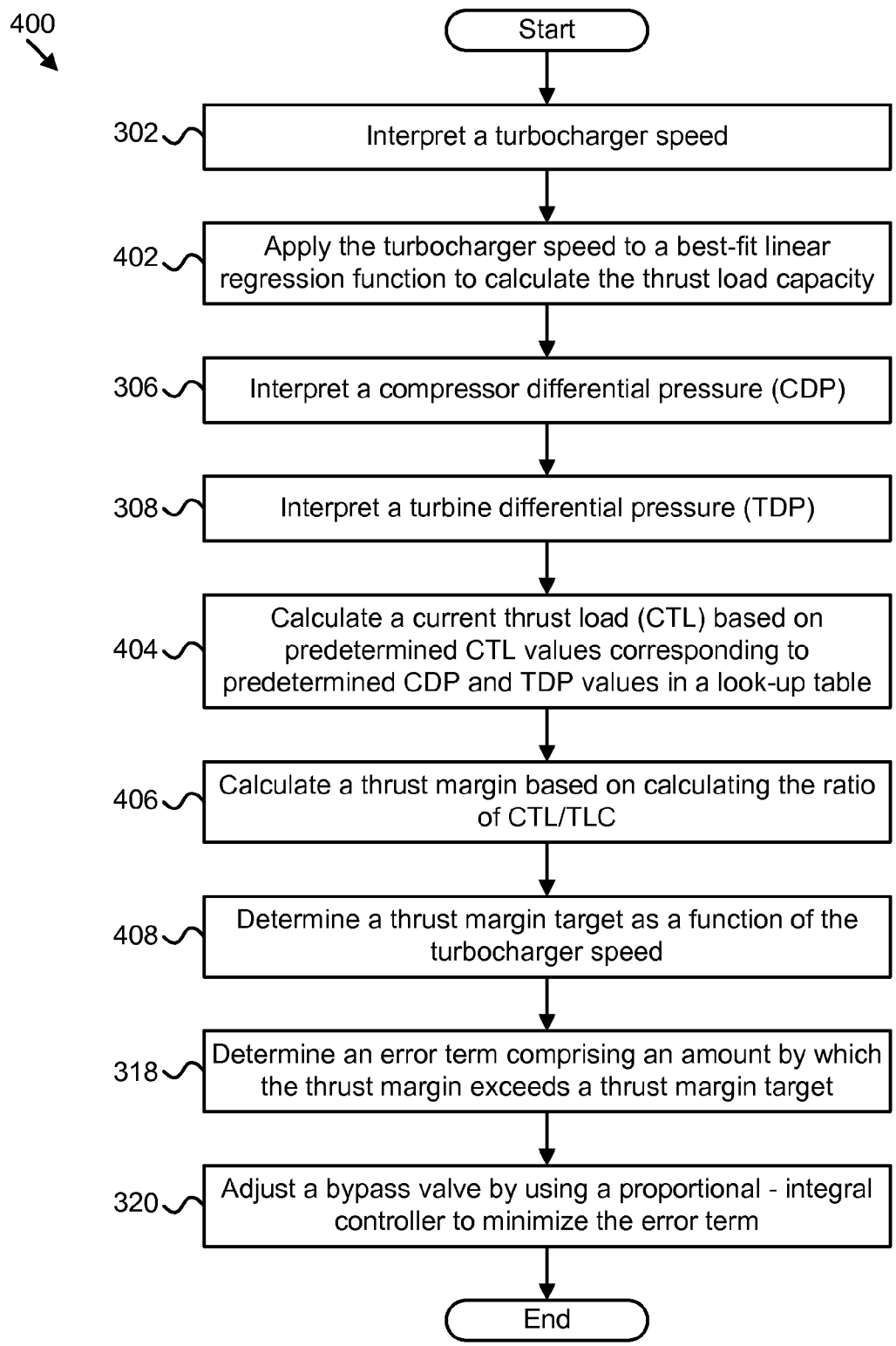
FIG. 4 is a schematic flow chart diagram illustrating an alternate embodiment of a method for preventing an underspeed event of a turbocharger in accordance with the present invention.

FIG. 4 is a schematic flow chart diagram illustrating an alternate embodiment of a method 400 for preventing an underspeed of a turbocharger in accordance with the present invention. In one embodiment the method 400 may be implemented as a computer program product comprising a computer readable medium having a computer readable program. The method 400 comprises a turbocharger speed determination module 202 interpreting 302 a thrust load capacity module 206 and applying 402 the turbocharger speed 204 to a best-fit linear regression function to calculate 304 a TLC 210 based on the turbocharger speed 204. The method 400 includes a differential pressure module 212 interpreting 306 a CDP and interpreting 308 a TDP. The method 400 continues with a current thrust load determination module calculating 310 a CTL based on the CDP and the TDP.

The method 400 includes a current thrust load determination module 218 calculating 404 a CTL on predetermined CTL values corresponding to predetermined CDP and TDP values in a look-up table. The look-up table may be constructed and calibrated by one of skill in the art through simple experimentation to determine the performance characteristics of a given turbocharger and compressor. In one embodiment the look-up table may be stored on a computer readable medium. The method 400 continues with a thrust determination module 224 calculating 412 the thrust margin 226 based on calculating the ratio of CTL/TLC. The method 400 further includes an actuation module 230 determining 318 an error term comprising an amount by which thrust margin exceeds the thrust margin target. The method 400 concludes with the actuation module 230 adjusting 320 a bypass valve by using a proportional-integral controller to minimize the error term.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for preventing an underspeed event of a turbocharger, the method: comprising:
    interpreting a turbocharger speed, a compressor differential pressure (CDP), and a turbine differential pressure (TDP);
    calculating a thrust load capacity (TLC) based on the turbocharger speed;
    calculating a current thrust load (CTL) based on the CDP and the TDP;
    calculating a thrust margin based on the TLC and the CTL; and
    controlling at least one actuator that adjusts the turbocharger speed in response to the thrust margin.

2. The method of claim 1, wherein calculating the thrust margin based on the TLC and the CTL comprises calculating a ratio CTL/TLC.

3. The method of claim 1, wherein calculating the thrust margin based on the TLC and the CTL comprises calculating a difference TLC-CTL.

4. The method of claim 1, wherein each of the at least one actuators comprises an actuator selected from the group consisting of a turbine bypass valve, a compressor bypass valve, and a variable geometry turbocharger position.

5. The method of claim 1, wherein each of the at least one actuators comprises an actuator selected from the group consisting of an intake throttle, an exhaust throttle, an exhaust gas recirculation valve, and an engine speed target.

6. The method of claim 1, wherein calculating the TLC based on the turbocharger speed comprises applying the turbocharger speed to a best-fit regression function, the best-fit regression function based on predetermined TLC values corresponding to predetermined turbocharger speed values.

7. The method of claim 6, wherein the best-fit regression function comprises a linear function.

8. The method of claim 1, wherein calculating the CTL based on the CDP and the TDP comprises applying the CDP and the TDP to a best-fit regression function, the best-fit regression function based on predetermined CTL values corresponding to predetermined CDP and TDP values.

9. The method of claim 8, wherein the best-fit regression function comprises a look-up table stored on a computer readable medium.

10. The method of claim 1, wherein calculating the CTL based on the CDP and the TDP comprises applying a function wherein:

$$CTL = K_1 * CDP + K_2 * TDP.$$

11. The method of claim 10, wherein a ratio of $K_1/K_2$ comprises a value between about 0.25 and 4.0 inclusive.

12. The method of claim 10, wherein a ratio of $K_1/K_2$ comprises a value between about 1.25 and 5.0 inclusive.

13. The method of claim 1, further comprising determining a thrust margin target, wherein controlling the at least one actuator in response to the thrust margin comprises adjusting the at least one actuator such that the thrust margin achieves the thrust margin target.

14. The method of claim 13, further comprising determining an error term, the error term comprising an amount by which the thrust margin exceeds the thrust margin target, wherein adjusting the at least one actuator comprises adjusting the at least one actuator to minimize the error term.

15. The method of claim 13, wherein determining the thrust margin target comprises selecting a first thrust margin target in response to the turbocharger speed having a value greater than a turbocharger speed threshold, and selecting a second thrust margin target in response to the turbocharger speed having a value not greater than the turbocharger speed threshold, wherein the second thrust margin target is greater than the first thrust margin target.

16. The method of claim 13, wherein the thrust margin target comprises a function of the turbocharger speed.

17. An apparatus for preventing an underspeed event of a turbocharger, the apparatus comprising:
a turbocharger speed determination module configured to interpret a turbocharger speed;
a thrust load capacity (TLC) determination module configured to calculate a TLC based on the turbocharger speed;
a differential pressure determination module configured to interpret a compressor differential pressure (CDP) and a turbine differential pressure (TDP);
a current thrust load (CTL) determination module configured to calculate a CTL based on the CDP and the TDP;
a thrust margin determination module configured to calculate a thrust margin based on the TLC and the CTL; and
an actuation module configured to control a bypass valve according to the thrust margin.

18. The apparatus of claim 17, wherein calculating the thrust margin based on the TLC and the CTL comprises calculating a ratio CTL/TLC.

19. The apparatus of claim 17, wherein the thrust margin determination module is further configured to determine a thrust margin target, and wherein the actuation module is further configured to control the bypass valve in response to the thrust margin by adjusting the bypass valve such that the thrust margin achieves the thrust margin target.

20. The apparatus of claim 17, wherein calculating the TLC based on the turbocharger speed comprises applying the turbocharger speed to a best-fit regression function, the best-fit regression function based on predetermined TLC values corresponding to predetermined turbocharger speed values.

21. The apparatus of claim 20, wherein the best-fit regression function comprises a linear function.

22. The apparatus of claim 17, wherein calculating the CTL based on the CDP and the TDP comprises applying the CDP and the TDP to a best-fit regression function, the best-fit regression function based on predetermined CTL values corresponding to predetermined CDP and TDP values.

23. The apparatus of claim 22, wherein the best-fit regression function based on predetermined CTL values corresponding to predetermined CDP and TDP values comprises a look-up table stored on a computer readable medium.

24. A computer program product comprising a computer readable medium having a computer readable program, wherein the computer readable program when executed on a computer causes the computer to:
interpret a turbocharger speed;
calculate a thrust load capacity (TLC) based on the turbocharger speed;
interpret a compressor differential pressure (CDP) and a turbine differential pressure (TDP);
calculate a current thrust load (CTL) based on the CDP and the TDP;
calculate a thrust margin based on a ratio of CTL/TLC;
determine an error term comprising an amount by which a thrust margin target exceeds the thrust margin; and
adjust a bypass valve utilizing a proportional-integral controller such that the error term is minimized.

25. The computer program product of claim 24, wherein calculating the TLC based on the turbocharger speed comprises applying the turbocharger speed to a best-fit linear regression function, the best-fit linear regression function based on predetermined TLC values corresponding to predetermined turbocharger speed values.

26. The computer program product of claim 24, wherein calculating the CTL based on the CDP and the TDP comprises applying the CDP and the TDP to a best-fit regression function based on predetermined CTL values corresponding to predetermined CDP and TDP values, the best-fit linear regression function comprising a look-up table stored on a computer readable medium.

27. The computer program product of claim 24, further comprising determining the thrust margin target by selecting a first thrust margin target in response to the turbocharger speed having a value greater than a turbocharger speed threshold, and selecting a second thrust margin target in response to the turbocharger speed having a value not greater than the turbocharger speed threshold, wherein the second thrust margin target is greater than the first thrust margin target.

28. The computer program product of claim 24, wherein the thrust margin target comprises a function of the turbocharger speed.

* * * * *